United States Patent [19]

Davison et al.

[11] 4,216,751
[45] Aug. 12, 1980

[54] PRE-VAPORIZING FUEL SYSTEM

[76] Inventors: Richard R. Davison, 303 Crescent; William B. Harris, Rte. 3, Box 293 A, both of Bryan, Tex. 77801

[21] Appl. No.: 680,115

[22] Filed: Apr. 26, 1976

[51] Int. Cl.$^2$ ............................................. F02M 31/00
[52] U.S. Cl. .................................... 123/523; 123/557
[58] Field of Search ............. 123/133, 122 E, 139 AS, 123/141, 121, 122 H, 34 A; 48/180 R

[56] References Cited

U.S. PATENT DOCUMENTS

| | | | |
|---|---|---|---|
| 2,315,881 | 4/1943 | Thomas | 123/121 |
| 2,746,440 | 5/1956 | Eriksen | 123/122 E |
| 2,832,204 | 4/1958 | Pilling | 123/133 |
| 2,884,917 | 5/1959 | Quimby | 123/133 |
| 3,738,334 | 6/1973 | Farr | 123/122 E |
| 3,777,726 | 12/1973 | Knapp | 123/139 AS |
| 3,855,980 | 12/1974 | Weisz | 123/122 E |
| 3,942,500 | 3/1976 | Koehm | 123/141 |
| 3,946,714 | 3/1976 | Eckert | 123/139 AS |
| 4,003,356 | 1/1977 | Naylor | 123/133 |

*Primary Examiner*—Ronald H. Lazarus

*Attorney, Agent, or Firm*—Michael L. Parks

[57] ABSTRACT

A fuel system adapted for use as the primary fuel source with a conventionally fueled and spark ignited internal combustion engine having a fuel tank for the primary fuel, a fuel pump for the primary fuel for pumping the primary fuel out of the fuel tank; a primary fuel vaporizer connected in communication with the pump and in heat conductive communication with a heat source for vaporizing the primary fuel, a vapor regulator means in vapor communication with the fuel vaporizer and the internal combustion engine for supplying fuel in varying amounts in response to varying conditions of demand on the engine and means connected to the system for sensing the conditions in the system and for switching said conventional fuel supply off and said primary fuel on when the conditions are sufficient for said primary fuel to operate the engine. Further in one embodiment only the primary fuel is used but it is used in liquid phase to inject the liquid primary fuel into the engine to start and operate the engine until conditions are sufficient for use of the vaporized primary fuel when said injectors are shut off.

20 Claims, 7 Drawing Figures

PRE-VAPORIZING FUEL SYSTEM

SUMMARY OF THE INVENTION

This invention relates to a new primary fuel system for using fuels which are liquids at ambient temperatures and pressures and have boiling points under 400° F. at ambient pressure such as methanol, ethanol, etc. . . . that are adaptable for use with conventionally fueled and spark ignited internal combustion engines. In at least one embodiment this invention is directed toward the use of only the primary fuel in the liquid phase to start the engine and continue its operation until the primary fuel is vaporized for insertion into the engine at which time the liquid phase is then cut off and the engine operates only on the vaporized primary fuel.

BACKGROUND OF THE INVENTION

While the use of alcohols as fuels is old in the art, it has never become a practical concept for use by the average motorist. Racing cars have long used blends and mixes of alcohols and gasoline to improve power and performance.

The problem with blends of gasoline and alcohols is that water vapor which becomes disolved in the blends, causes phase separation of the alcohol and gasoline to give an unuseable fuel.

Also the prior art is full of unsuccessful attempts at using straight methanol as a fuel to try to capture the added power found in the latent heat of vaporization of alcohols, but to no avail.

Further the prior art S.A.E. publication S.P. - 254 of June, 1964, "A Survey of Alcohol as a Motor Fuel", by J. A. Bolts, points out no advantage is gained in the use of alcohols if the alcohol has its heat of vaporization used prior to being put into the engine cylinder, and thus the article dismisses the use of alcohols for use as motor fuels because they contain no advantage over gasoline and to date alcohols have not been practical.

Also, in this day and time of pollution concern, there is a real demand for converting engines to better and different forms to continue the burning of gasoline; but, no solution has been looked at except LPG fuels to find a cleaner burning fuel. In fact, alcohols have been dismissed because of their inherent problems with water, cold start, etc...

Also, in using methanol as a single fuel, the prior art has experienced problems of Cold Start and uneven fuel distribution when using normal carburetors. The use of special carburetors causes great expense to convert the engines to run on methanol, which further drove the prior art away from the use of alcohols as motor fuels.

Also, all the prior art conversions for gasoline to methanol have been very impractical and have generally led to a one fuel system of either gasoline or methanol.

Another problem in the prior art was to find a way to inexpensively control the vaporization of liquid fuels such as Methanol and Ethanol. While the prior art has provided various systems, they have all been very complex and expensive.

Further, the prior art has found that alcohols, especially Methanol, can be very hard on fuel systems by dissolving gaskets, corroding and valves.

OBJECT OF INVENTION

The object of this invention is to provide a simple and practical fuel system which can utilize alcohols such as Methanol and Ethanol as fuels without expensive alterations of the existing internal combustion engine.

Also, it is an object of this invention to provide a fuel system for alcohols which is compatible with the existing gasoline systems in use with internal combustion engines and does not require major modification of the carburetors and fuel system.

It is also an object of this invention to provide a fuel system which may be used with a conventional gasoline fuel system when only gasoline is available and alcohols are not, so that the car may be run on either gasoline or alcohol simply by throwing a switch which may be manually or automatically activated.

It is a further object of this invention to provide a fuel which gives substantially complete combustion and clean exhaust products. Alcohols tend to more fully burn because they are smaller molecules and thus have fewer possible by-products of combustion.

It is also an object of this invention to provide a fuel which has low carbon deposit and extends the life of the engine parts.

It is an object of this invention to provide an easy starting and smooth running internal multiple fuel combustion engine which starts in a conventional manner without requiring the driver to do anything more than turn the key.

Another object is to provide an inexpensive and simple vaporizer and means to control vaporization of the alcohols and to control pressure surges in the system and the vaporizer.

It is yet another object of this invention to provide a fuel system using materials which are corrosion resistant and which are non-catalytic for the formation of carbon from the alcohols.

These and other objects will be apparent from the drawings and the following descriptions, the drawings which are for illustrations of some embodiments of this invention.

Figure 1:
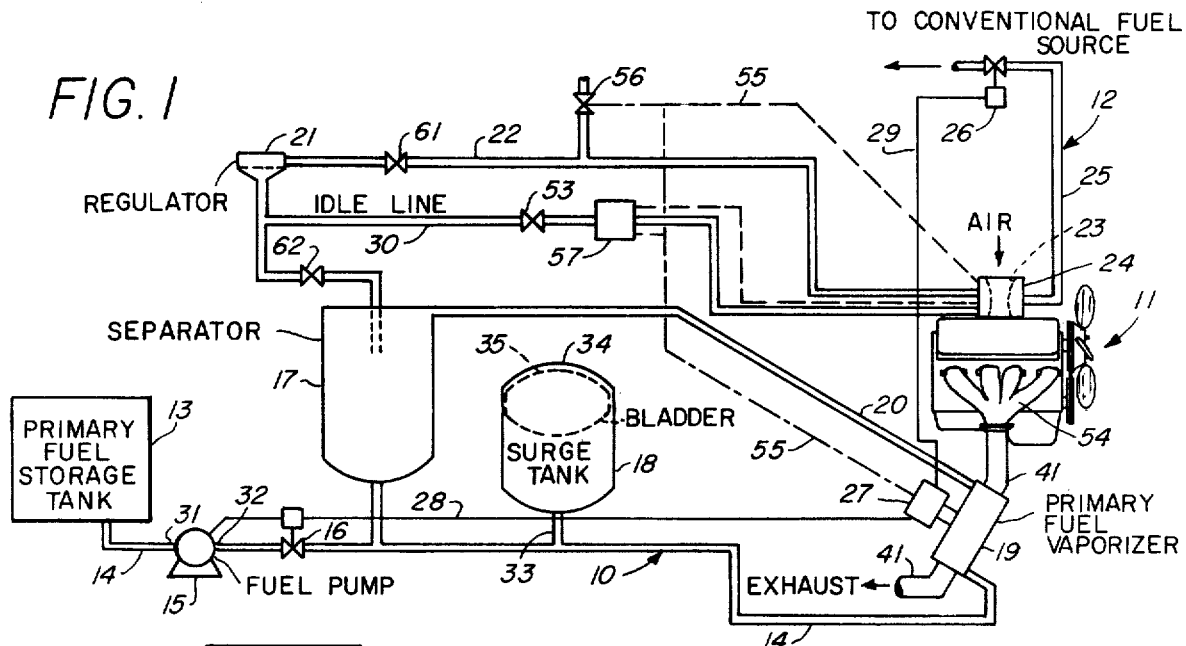
FIG. 1 is a diagrammatic view of the fuel system of this invention shown mounted on a conventionally fueled and internal combustion engine.

Referring now to the drawings and more particularly to FIG. 1, the primary fuel system 10 is shown connected to an internal combustion engine 11 which is also shown connected to a conventional fuel source 12.

The primary fuel system 10 is composed of a primary fuel storage tank 13 connected by a liquid fuel line 14 into fluid communication with a fuel pump 15 for transporting the primary fuel from the primary fuel storage tank 13. The fuel pump 15 is connected to a first valve 16 for controlling the flow from the primary fuel storage tank 13 and fuel pump 15. A separator 17 and a surge tank 18 are connected in fluid communication with the primary fuel system 10 by the fuel line 14 which is then connected into fluid communication with a primary fuel vaporizer 19. The primary fuel vaporizer 19 is connected by vapor primary fuel line 20 into vapor communication with a vapor regulator 21. Intermediate on the vapor primary fuel line 20 between the vapor regulator 21 and the primary fuel vaporizer 19 is connected separator 17 for the return of any condensed primary fuel to the liquid fuel line 14. The vapor regulator 21 is connected by vacuum conduit 22 to the venturi 23 attached to part of the standard carburetor 24 of the internal combustion engine 11.

Also connected to the standard carburetor 24 is a conventional fuel line 25 which is connected to a conventional gasoline fuel tank not shown. Intermediate the connection of the conventional fuel line 25 is connected a 2nd valve 26 for controlling the flow of conventional fuel. Connected to the primary fuel vaporizer 19 are sensors 27 for sensing the conditions in this vaporizer 19. The sensors 27 provide an indication when the conditions in said primary fuel vaporizer 19 are sufficient to vaporize the primary fuel therein. In one embodiment control lines 28 are provided to 1st valve 16 and control lines 29 are provided to 2nd valve 26 for actuating the 1st valve 16 and 2nd valve 26 to prevent both valves from being open to flow their respective fuels at the same time.

Also connected to said vapor primary fuel line 20 intermediate the vaporizer 19 and the regulator 21 is provided an idle line 30 for feeding a predetermined amount of vaporized fuel into the carburetor 24 for maintaining the vaporized fuel to the engine to maintain the idle speeds of the engine.

The primary fuel may be any conventional fuel which can be held in the primary fuel storage tank 13 of this invention such as Methanol, Ethanol and any other fuel which is a liquid at ambient temperature and pressure and has a boiling point under 400° F. at ambient pressure.

The liquid fuel line 14 connects the primary fuel storage tank 13 with intake side 31 of the fuel pump 15 which transports fuel from the tank 13. The fuel pump 15 can be of any standard type which will resist the chemical effects of the primary fuel and which maintains a constant maximum discharge pressure at the discharge side 32. For example if the desired maximum discharge pressure is 8 PSI, then the fuel pump 15 will pump liquid primary fuel out the discharge side 32 until an 8 PSI pressure is achieved and then the fuel pump 15 ceases to pump additional primary fuel from the primary fuel storage tank 13, but when the pressure goes below 8 PSI the fuel pump 15 again begins to discharge fuel.

Figure 7:
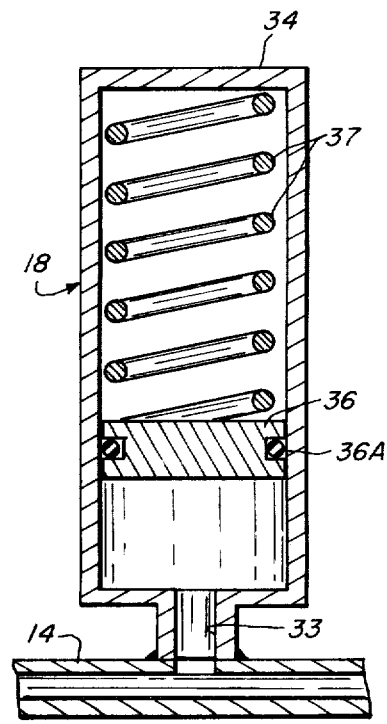
FIG. 7 is a diagrammatic view of a surge control shown in cross sectional view.

The surge tank 18 is connected in fluid communication with the liquid fluid line 14 on one end 33. The other end 34 has in one embodiment a gas filled bladder 35 which compresses and decompresses in response to pressure surges in the liquid fuel line. In other embodiments as shown in FIG. 7 of the surge tank 18, the other end 34 has mechanical pressure dampers such as a pistonhead 36 acting on a spring 37 to control surges. In this embodiment liquid primary fuel is put into the surge tank 18 through the one end 33 connected to liquid fuel line 14 in response to surges in the line 14 and the pistonhead 36 responds by compressing the spring 37 to damper the surge in the system. It should be understood that pistonhead 36 has a seal 36A about the pistonhead 36 to prevent the primary fuel from by-passing the piston head 36.

Figure 2:
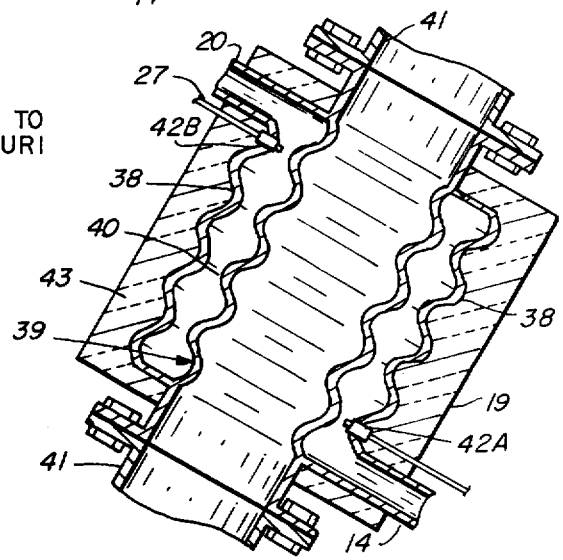
FIG. 2 is a cross-sectional view of the vaporizer of this invention.

The liquid fuel line 14 from the surge tank 18 then feeds fuel to the primary fuel vaporizer 19 for vaporizing the primary fuel. The primary fuel vaporizer 19 can best be seen in FIG. 2 where the liquid fuel line 14 is shown in fluid communication with the primary fuel vaporizer 19. The primary fuel vaporizer 19 allows the liquid primary fuel to enter the vaporizer chamber 38 which is connected in heat conductive communication with a heat source, which in this embodiment is generally a heater 39 which has convoluted surfaces 40 and is connected into the exhaust pipe 41. The convoluted surfaces 40 are provided to give increased surface area for increased heat transfer for more rapid vaporization of the liquid primary fuel and also to allow for thermal expansion of the material from which the heater 39 is made. It should be understood that material such as copper and stainless steel are required because if heater 39 were made of mill steel if would catalize methanol to elemental carbon and clog the system.

In this embodiment heat from the exhaust gas passes through the heater 39 and the heat is conducted through said heater 39 to the vaporizer chamber 38 where the liquid primary fuel is vaporized. As the liquid fuel is vaporized it is passed out of the vaporizer chamber 38 into a vapor primary fuel line 20. Sensors 27 are connected to the vaporizer 19 and sensing head 42A and 42B are provided to sense the conditions in the vaporizer chamber 38.

The sensing head 42A and 42B may be for sensing pressure or temperature. In some embodiments the sensing heads 42A and 42B or only one head 42A may be for sensing temperature. In yet another embodiment sensing heads 42A and 42B or only 42B may be for sensing pressure. In other embodiments temperature sensing head 42A and pressure sensing head 42B may be used together for sensing both temperature and pressure in the vaporizer 19.

It should be understood that while the exact design of the vaporizer is probably a designer's choice, there are certain relationships of design which are most important to the functioning of the vaporizer as a variable area vaporizer.

Vaporizer 19 for example provides adjustment of the pressure in the vaporizer by varying the quantity of primary fuel exposed to the heat conductive heater 39 in said vaporizer 19 by increases in pressure driving the primary liquid fuel out of the vaporizer into the surge tank 18. As the liquid fuel is driven out the amount of liquid fuel being vaporized is immediately reduced to prevent excessive pressure buildup. When great demand is made on the system and a low pressure is created at vapor primary fuel line 20 the surge means 18 and or fuel pump 15 in conjunction with the low pressure flow fuel to the vaporizer 19 thus exposing greater quantities of the primary fuel to the heater 39 and immediately vaporizing greater quantities of fuel. It should be noted that the location of liquid fuel line 14 in the vaporizer 19 is significant in that the point of connection for fluid communication with the liquid primary fuel line 14 is below or at the Lowest point in the vaporizer 19 for conductive communication of the heater 39 with the liquid fuel. If this arrangement were not provided in the vaporizer 19, then in cases of high pressure, the vapor pressure could not be used to drive the liquid primary fuel out of the vaporizer chamber 38 and over pressuring of the system would occur until all the fuel in the vaporizer chamber 38 was vaporized. Also insulation 43 can be provided to help hold the heat constant and prevent ambient temperature changes from affecting the operation of the vaporizer 19.

Figure 4:
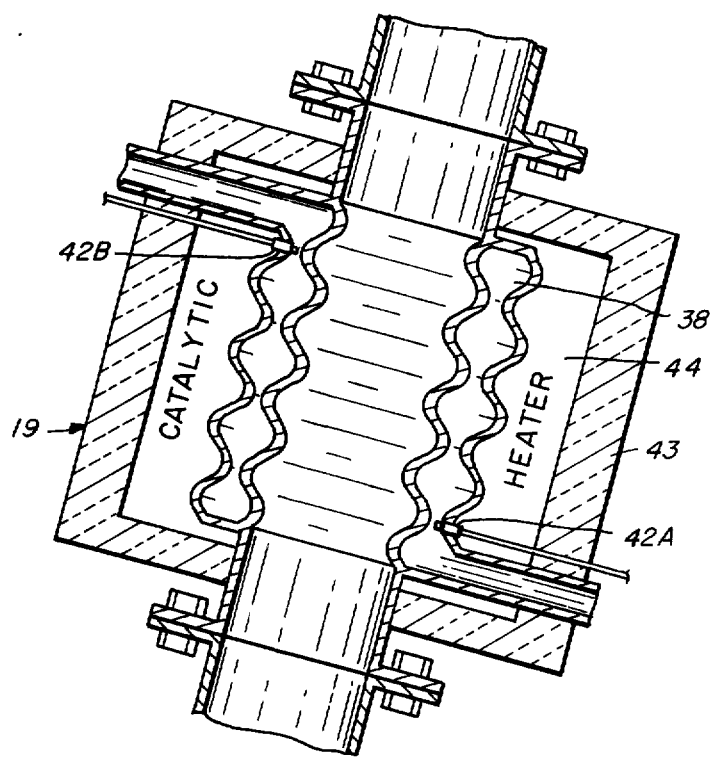
FIG. 4 is a cross-sectional of another embodiment of the vaporizer of this invention.
Figure 5:
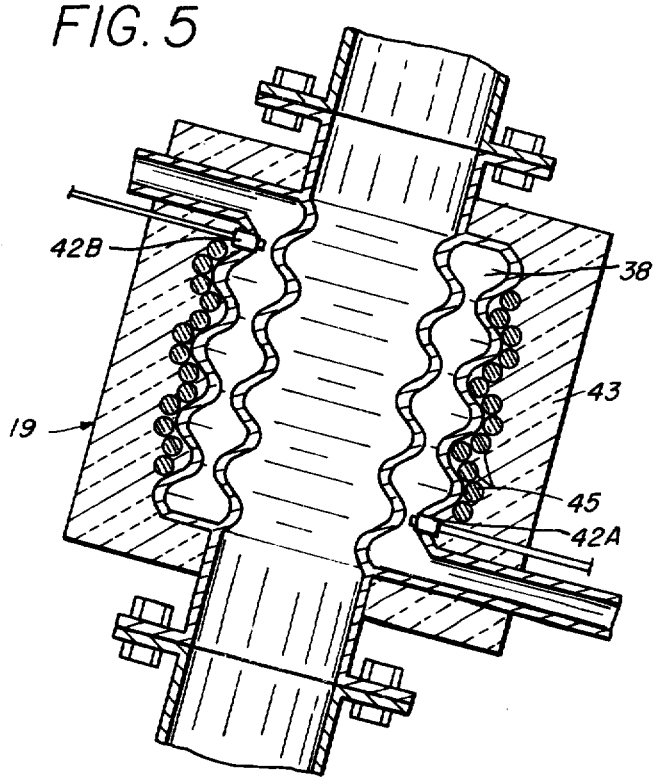
FIG. 5 is another embodiment of the vaporizer of this invention.

In other embodiments best shown in FIG. 4 and FIG. 5, additional heaters are provided for heating the fuel when the exhaust gases are not hot enough or as alternatives to the use of exhaust gases as a heater. In FIG. 4 an alcohol catalytic heater 44 is provided about the vaporizer chamber 38 and this catalytic heater 44 is then insulated with insulation 43.

In FIG. 5 an electrical heater 45 is provided about the vaporizer chamber 38 and this electrical heater 45 is then insulated with insulation 43.

The vapor primary fuel line 20 feeds primary fuel vapor through a separator to remove any liquid primary fuel wich may have condensed in the vapor fuel line 20. Then the vaporized fuel is fed to the vapor regulator 21.

Figure 3:
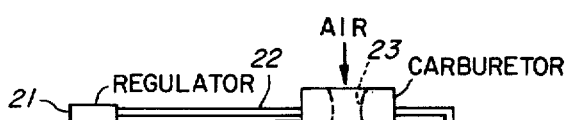
FIG. 3 is a cross-sectional diagrammatic view of the vapor regulator of this invention.

The vapor regulator 21 is best shown in FIG. 3 where vaporized fuel line 20 is shown in vapor communication with the vapor regulator 21. The vapor regulator 21 comprises in this embodiment a housing 46 which is divided into 1st and 2nd chambers. The 1st chamber 47 having relatively higher pressure than the 2nd chamber 48 which has a relatively lower pressure. Within the 2nd chamber 48 is provided a valve 49 which prevents flow from the 1st chamber into the 2nd chamber except in response to positive activation. The valve 49 is held closed by spring 50. A diaphragm 51 connected to the valve 49 provides positive activation through the expansion downward of the diaphragm 51 which is caused by difference in the pressure at the pressure equalization line 52 open to venturi inlet pressure and the lower pressure in the 2nd chamber 48 caused by demands of engine operation through vacuum conduit line 22 to the carburetor 24 of the engine 11. Thus the valve 49 is open in response to engine demand and the greater the demand the greater the flow through valve 49. Valve 61 is provided on line 22 for providing a proportional flow of vaporized primary fuel there though to control the air fuel mix. By simple adjustments of this valve the primary fuel can be changed over from methanol to ethanol or other fuels.

A conduit idle line 30 is connected on vapor fuel line 20 for feeding a constant volume of vaporized fuel into the engine 11 to establish and maintain an idle speed in the engine. A valve 53 is connected on the conduit idle line 30 to control or adjust the constant volume of vaporized fuel being fed into the engine 11.

It should be understood that the engine 11 is started in a conventional manner using gasoline. The engine continues to run on gasoline and discharge the heated gases into the exhaust manifolds 54 which feed into the exhaust pipe 41. The heated exhaust gases then pass into the primary fuel vaporizer 19; however on initial starting of the engine the heat of the exhaust gases does not immediately provide the primary fuel vaporizer 19 with sufficient heat to vaporize the primary fuel and thus the engine 11 must operate on gasoline until sufficient heat conditions are reached to vaporize the primary fuel. Once sufficient heat is present the sensor 27 shuts off valve 26 by way of control line 29 and control line 28 opens valve 16 to flow the primary fuel. However a carburetor generally has a fuel bowl which has fuel present even after the conventional fuel is shut off and thus that fuel must be burned before the primary fuel system of this invention can be used. If both systems are turned together on the engine will flood.

Sensors 27 can be provided with a time delay mechanism not shown so that when valve 26 is closed there is a time delay before valve 16 is turned on to feed fuel into the primary fuel system of this invention. This delay allows the conventional fuel to be consumed before the vaporized fuel is feed therein.

In an embodiment where both temperature and pressure conditions are sensed the sensor 27 may be provided with switches not shown for closing valve 26 when the temperature is sufficient in the vaporizer 19 for vaporizing said primary fuel and holding said valve 26 closed until the pressure conditions are insufficient in said vaporizer when said valve 26 would reopen to flow gasoline and close off the flow of vaporized primary fuel. In the above embodiment it has been found desirable to locate the temperature sensor head 42A proximate the point of flowing the liquid primary fuel into the vaporizer because the complete heater 39 would be heated to a sufficient temperature for vaporization of the primary fuel before any activation of value 26; and thus gives a better indication of sufficient conditions in the system. By locating the pressure sensor head 42B proximate the point of flowing the vaporized primary fuel from the vaporizer a better indication of sufficient vapor pressure in the vaporizer 19 is given. The dual sensor heads 42A and 42B can be arranged with switching circuit to provide complete automatic switching from gasoline to the primary fuel and back to gasoline without the driver being aware of which fuel is being used.

In yet another embodiment a switch not shown can be connected to the carburetor 24 float valve to actuate sensor 27 into opening valve 16 by way of control line 55 when the fuel bowl of the carburetor is emptied.

Also in conjunction with the opening of the valve 16 additional valves 56 and 57 are simultaneously activated to open idle line 30 through valve 57 and close Valve 56. To flow vaporized primary fuel, Valve 56 is a valve which when closed allows the carburetor to draw a vacuum and when open draw ambient air, thus preventing a vacuum from being drawn in chamber 48 of the vapor regulator 21 and thus keeping valve 49 closed.

Figure 6:
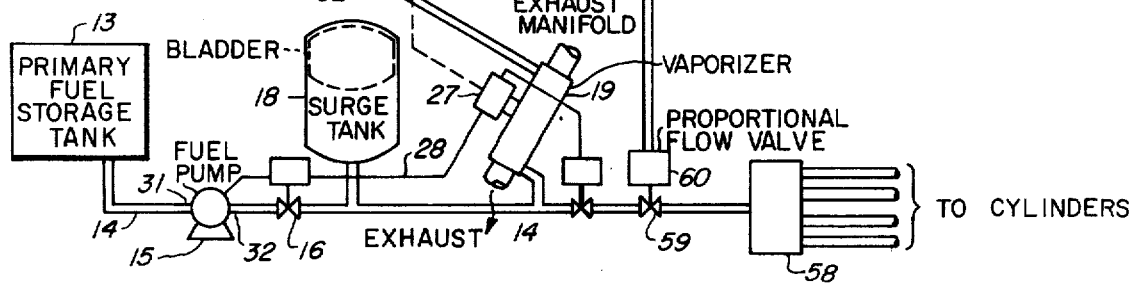
FIG. 6 is a diagrammatic view of the primary fuel system using only the primary fuel.

In another embodiment of this invention as shown in FIG. 6 the primary fuel is the only fuel to be used and in this embodiment the engine not shown is started on primary fuel fed through fuel injectors 58. The fuel injectors 58 are operated until conditions in the primary fuel system above described are operable and then valve 59 is shut off and the engine runs on vaporized primary fuel. While the engine 11 is running on liquid fuel a proportional flow valve 60 is connected in communication with the carburetor 24 for controlling the air fuel mixture being fed into the engine. In all embodiments a cut off valve 62 may be provided to shut down the vapor system should it be necessary.

We claim:

1. In combination with an engine having a conventional fuel supply system and being a spark ignited internal combustion engine an improved fuel system for use as a primary fuel source comprising;
   (a) A fuel storage means for storing the primary fuel;
   (b) A primary fuel transport means connected in fluid communication with said fuel storage means for transporting said primary fuel from said storage means;
   (c) A heat source means:
   (d) A primary fuel vaporizing means connected in fluid communication with said primary fuel transport means and connected in heat conductive communication with said heat source means for vaporizing said primary fuel and for controlling vaporization when vaporized primary fuel pressure is high by controlling the quantity of liquid primary fuel exposed to said heat source means by the pressure of said vaporized primary fuel forcing said liquid primary fuel out of heat conductive communication with said heat source means:

(e) A vapor regulator means in vapor communication with said primary fuel vaporizing means for supplying vaporized primary fuel in varying amounts in response to varying conditions of demand on said engine; and (f) Means connected to said system for sensing the conditions in said system and switching said conventional fuel supply system off and said primary fuel source on when the conditions sensed in said primary fuel vaporizing means are sufficient for the use of said primary fuel.

2. A fuel system of claim 1 wherein said heat source means is a heater means connected to said primary fuel vaporizing means in heat conductive communication for vaporizing said primary fuel in said primary fuel vaporizing means.

3. A fuel system of claim 2 further comprising a surge means connected to said primary fuel system for controlling pressure surges in said system.

4. A primary fuel system of claim 3 wherein said primary fuel vaporizing means provides adjustments of the pressure in said primary fuel vaporizing means by the pressure in said primary vaporizing means varying the quantity of primary fuel exposed for vaporization by heat conductive communication in said primary vaporizing means.

5. In combination with an engine having a conventional fuel supply system and being a spark ignited internal combustion engine an improved fuel system for use as a primary fuel source comprising:

(a) A fuel storage means for storing the primary fuel;
(b) A primary fuel transport means having intake and discharge sides connected in fluid communication with said fuel storage means for transporting said primary fuel from said fuel storage means;
(c) A heat source means;
(e) A primary fuel vaporizing means connected in fluid communication with surge means and with said discharge side of said primary fuel transport means and in heat conductive communication with said heat source means for vaporizing said primary fuel and for controlling vaporization when said primary fuel vaporized exceeds the demand for said vaporized fuel by the pressure of said vaporized fuel forcing said liquid primary fuel out of said primary fuel vaporizing means into said surge means to prevent further liquid primary fuel from being vaporized:
(d) A surge means connected in fluid communication with said primary fuel system on said discharge side of said primary transport means said primary fuel vaporizing means to control pressure surges:
(f) A vapor regulator means in vapor communication with said primary fuel vaporizing means and said internal combustion engine for supplying vaporized primary fuel in varying amounts in response to varying conditions of demand on said engine; and
(g) Means connected to said system for sensing the conditions in said system and switching said conventional fuel supply system off and said primary fuel source on when the conditions sensed in said primary fuel vaporizing means are sufficient for the use of said primary fuel.

6. A primary fuel system of claim 5 wherein the location of said connection for fluid communication with said primary fuel transport means and said primary fuel vaporizing means is below the lowest point in said primary vaporizing means for conductive communication with said heat source means.

7. A primary fuel system of claim 6 wherein said heat source means derives its heat from the wasteheat of said internal combustion engine.

8. A primary fuel system of claim 7 and wherein said waste heat is from exhaust gases from said internal combustion engine.

9. A primary fuel system of claim 5 wherein said surge means has a compressible means at one end of said surge means and is connected in fluid communication on the other end to said primary fuel system for receiving and storing said primary fuel at pressures equal to or greater than the discharge pressure of said primary fuel transport means when said primary fuel is forced out of said primary fuel vaporizing mean and into said surge means until said compressible means redelivers said primary fuel back to said primary fuel vaporizing means under conditions of greater demand for primary fuel.

10. A primary fuel system of claim 9 wherein said compressible means is a gas filled bladder which compresses and decompresses upon receiving for storage or discharging from storage said primary fuel in response to pressure changes in said primary fuel vaporizer which drive said primary fuel out of or into said primary fuel vaporizer means.

11. A primary fuel system of claim 6 wherein said means connected to said system for sensing the conditions in said system is further comprising:

A first valve means connected to said primary fuel system intermediate and primary fuel storage means and said vapor insertion point on said internal combustion engine and connected to said sensing means for actuation of said first valve means in response to said sensed conditions; and Second valve means connected to said conventional fuel system intermediate the conventional fuel tank and the vapor insertion point on said internal combustion engine and connected to said sensing means for actuation of said 2nd valve means in response to said sensed conditions.

12. A primary fuel system of claim 11 wherein said sensing means is connected to said primary fuel vaporizer means for sensing the conditions therein and for actuating said first and second valve means for preventing both first and second valve means from both being open to flow of their respective fuels at the same time.

13. A primary fuel system of claim 12 wherein said sensing means is a temperature sensitive actuator for actuation of said 1st and 2nd valve means in response to said temperature in said vaporizer.

14. The primary fuel system of claim 12 wherein said sensing means is a pressure sensitive activator for activation of said 1st and 2nd valve means in response to said pressure in said vaporizer.

15. The primary fuel system of claim 12 wherein sensing means are sensitive to temperature and pressure for activation of said first and second valve means in response to said temperature and pressure in said vaporizer.

16. A primary fuel system of claim 11 further comprising a float valve means connected in said carburetor bowl of said engine for indicating the conventional fuel supply level in said carburetor; and a third valve means connected intermediate said engine and said primary fuel vaporizing means for opening and closing said vaporized portion of said primary fuel system in response to said indication in said float value means such that said primary vaporized fuel and said conventional fuel supply are not both flowing at the same time.

17. A primary fuel system of claim 5 further comprising a separator means connected intermediate said vaporizer and said vapor regulator means for separating the liquid primary fuel from the vaporized primary fuel and for the return of said liquid primary fuel to said liquid portion of said primary fuel system.

18. A primary fuel system of claim 1 wherein said vapor regulator means further comprises
  (a) A housing means divided into chambers and connected to said primary fuel system; and
  (b) A valve means between said chambers for controlling flow of vaporized primary fuel from one chamber to the other chamber in response to vacuum conditions created by fuel demands in said spark ignited internal combustion engine.

19. A fuel system of claim 5 wherein said conventional fuel is gasoline and said primary fuels are alcohols.

20. A primary fuel system of claim 3 wherein said vaporizer means is made of a material which is chemically or catalytically unreactive with said primary fuel.

* * * * *